United States Patent [19]

Gladrow et al.

[11] 4,242,237

[45] Dec. 30, 1980

[54] HYDROCARBON CRACKING CATALYST AND PROCESS UTILIZING THE SAME

[75] Inventors: Elroy M. Gladrow; William E. Winter, both of Baton Rouge, La.

[73] Assignee: Exxon Research & Engineering Co., Florham Park, N.J.

[21] Appl. No.: 44,360

[22] Filed: May 31, 1979

[51] Int. Cl.$^3$ .......................... B01J 29/08; B01J 29/18
[52] U.S. Cl. .................... 252/455 Z; 208/120
[58] Field of Search ...................... 252/455 Z; 208/120

[56] References Cited

U.S. PATENT DOCUMENTS

| | | | |
|---|---|---|---|
| 3,402,996 | 9/1968 | Maher et al. ................ | 252/455 Z |
| 3,702,886 | 11/1972 | Argauer et al. .............. | 423/328 |
| 3,758,403 | 9/1973 | Rosinski et al. .............. | 208/120 |
| 3,764,520 | 10/1973 | Kimberlin, Jr. et al. ........ | 208/111 |
| 3,769,202 | 11/1973 | Plank et al. ................. | 208/111 |
| 3,804,747 | 4/1974 | Kimberlin, Jr. et al. ........ | 208/120 |
| 3,871,993 | 3/1975 | Morrison .................... | 252/455 Z |
| 3,894,934 | 7/1975 | Owens et al. ................ | 208/120 X |
| 3,925,195 | 12/1975 | Scherzer et al. .............. | 208/120 |
| 4,097,410 | 6/1978 | Gladrow .................... | 252/455 Z |
| 4,137,152 | 1/1979 | Chester et al. ............... | 208/120 |

Primary Examiner—Carl F. Dees
Attorney, Agent, or Firm—Marthe L. Gibbons

[57] ABSTRACT

A hydrocarbon cracking catalyst comprises an ultrastable Y-type crystalline zeolite, a small pore crystalline zeolite such as mordenite, an inorganic oxide matrix and, optionally, a porous inert component. The cracking catalyst has a high activity and selectivity for the production of high octane naphtha fractions from higher boiling point hydrocarbonaceous oils. Catalytic cracking processes utilizing the catalyst are also provided.

11 Claims, No Drawings

HYDROCARBON CRACKING CATALYST AND PROCESS UTILIZING THE SAME

BACKGROUND OF THE INVENTION

1. Field of the Invention

The present invention relates to hydrocarbon cracking catalysts and uses thereof in catalytic cracking processes.

2. Description of the Prior Art

Hydrocarbon cracking catalysts comprising a zeolite dispersed in a siliceous matrix are known. See, for example, U.S. Pat. No. 3,140,249 and U.S. Pat. No. 3,352,796.

U.S. Pat. No. 4,137,152 discloses a cracking process utilizing a mixture of faujasite and mordenite.

U.S. Pat. No. 3,894,934 discloses catalytic cracking of hydrocarbons utilizing a large pore zeolite and a small pore zeolite such as zeolite ZSM-5. These zeolites may be dispersed in a common matrix.

U.S. Pat. No. 3,871,993 discloses a process for upgrading the octane value of naphtha utilizing a shape selective catalyst such as zeolite ZSM-5, ZSM-11, ZSM-12, ZSM-21, mordenite, etc., in the absence of added hydrogen.

U.S. Pat. No. 3,702,886 discloses use of ZSM-5 zeolite alone or in combination with other materials such as zeolites or inert materials for catalytic cracking of hydrocarbons, see particularly columns 6 and 7.

U.S. Pat. No. 3,804,747 discloses a hydrocarbon conversion process utilizing a mixture of zeolites X and Y.

U.S. Pat. No. 3,758,403 discloses catalytic cracking comprising a large pore zeolite, such as zeolite Y, and a small pore zeolite, such as ZSM-5, in a siliceous matrix. The matrix may be active or inactive, such as silica-alumina or alumina. The use of the ZSM-5 type zeolite results in obtaining a fuel of increased octane number.

U.S. Pat. No. 3,769,202 discloses a combination catalyst comprising a mixture of two different zeolites, one having a pore size greater than 8 Angstroms and the other having a pore size of less than 7 Angstroms. The zeolites are mixed with an inorganic oxide matrix such as silica-alumina. The catalyst is suitable for cracking and hydrocracking of hydrocarbons.

U.S. Pat. No. 3,925,195 discloses a cracking process utilizing a catalyst comprising a mixture of rare earth hydrogen Y-type zeolite, and hydrogen or transition metal exchanged mordenite, calcium exchanged type A zeolite, or hydrogen exchanged erionite and an amorphous matrix.

U.S. Pat. No. 3,764,520 discloses a catalyst comprising a mixture of two different zeolites, one having a pore size within the range of 6 to 15 Angstroms and the other having a pore size of less than 6 Angstroms in combination with an inorganic oxide support. The catalyst is useful for hydrocarbon conversion processes to give increased selectivity.

SUMMARY OF THE INVENTION

In accordance with the invention there is provided:

(a) an ultrastable Y-type crystalline aluminosilicate zeolite having less than about 1 weight percent rare earth metals, calculated as the elemental metal, based on the zeolite;

(b) a small pore crystalline aluminosilicate zeolite selected from the group consisting of erionite, mordenite, zeolite A, chabazite and offretite, and (c) a catalytic inorganic oxide matrix.

In one embodiment of the invention the catalyst additionally comprises a porous inorganic oxide having specific physical characteristics.

Furthermore, in accordance with the invention there is provided, a catalytic cracking process utilizing the above-stated catalyst.

DETAILED DESCRIPTION OF THE INVENTION

ULTRASTABLE Y-TYPE ZEOLITE COMPONENT

"Stabilized" or ultrastable Y-type zeolites are well known. They are described, for example, in U.S. Pat. Nos. 3,293,192 and 3,402,996 and the publication, Society of Chemical Engineering (London) Monograph Molecular Sieves, page 186 (1968) by C. V. McDaniel and P. K. Maher, the teachings of which are hereby incorporated by reference. In general, "ultrastable" refers to a Y-type zeolite which is highly resistant to degradation of crystallinity by high temperature and steam treatment and is characterized by a $R_2O$ content (wherein R is Na, K or any other alkali metal ion) of less than 4 weight percent, preferably less than 1 weight percent and a unit cell size less than 24.5 Angstroms and a silica to alumina mole ratio in the range of 3.5 to 7 or higher. The ultrastable form of Y-type zeolite is obtained primarily by a substantial reduction of the alkali metal ions and the unit cell size reduction. The ultrastable zeolite is identified both by the smaller unit cell and the low alkali metal content in the crystal structure.

As is generally known, the ultrastable form of the Y-type zeolite can be prepared by successively base exchanging a Y-type zeolite with an aqueous solution of an ammonium salt, such as ammonium nitrate, until the alkali metal content of the Y-type zeolite is reduced to less than 4 weight percent. The base exchanged zeolite is then calcined at a temperature of 1000° F. to 1500° F. for up to several hours, cooled and thereafter again successively base exchanged with an aqueous solution of an ammonium salt until the alkali metal content is reduced to less than 1 weight percent, followed by washing and calcination again at a temperature of 1000° to 1500° F. to produce an ultrastable zeolite Y. The sequence of ion exchange and heat treatment results in the substantial reduction of the alkali metal content of the original zeolite and results in a unit cell shrinkage which is believed to lead to the ultra high stability of the resulting Y-type zeolite. The particle size of the zeolites is usually in the range of 0.1 to 10 microns, more particularly in the range of 0.5 to 3 microns. For use in the present invention, the ultrastable Y-type zeolite components of the catalyst will be substantially free of rare earth metals such as for example cerium, lanthanum, praseodymium, neodymium, promethium, samarium, europium, gadolinium, terbium, dysprosium, holmium, erbium, yttrium, thulium, scandium, lutecium and mixtures thereof. By "substantially rare earth free" is meant that the rare earth metal content of the zeolite will be less than about 1 weight percent, calculated as the elemental metal, based on the zeolite. Similarly small amounts (1 weight percent) of magnesium or calcium ions may be exchanged into the zeolite.

Suitable amounts of the ultrastable Y-type zeolite in the catalyst of the present invention include from about 0.1 to about 40 weight percent, preferably from about 5 to about 25 weight percent, based on the total catalyst.

THE SMALL PORE ZEOLITE COMPONENT

Suitable small pore zeolite components include crystalline aluminosilicate zeolites having pore diameters not greater than about 10 Angstroms, preferably not greater than 9 Angstroms. Some of these zeolites have elliptical pore openings with a major axis of about 8 to 9 Angstroms and a minor axis of about 5.5 to 7 Angstroms.

The zeolites described as being shape selective will preferentially permit the ingress and egress of some types of components from a mixture comprising several types of components. The particular shape selective zeolite that will be chosen for use in a given process will depend on the components that it is desired to preferentially sorb into the pores of the zeolite. The small pore zeolite may be a naturally occurring zeolite or a synthetic zeolite. Suitable small pore zeolites include erionite, chabazite, offretite, mordenite, Linde Division of Union Carbide's zeolite designated "Zeolite A" described in U.S. Pat. No. 2,822,243. The preferred small pore zeolite for use as component of the present catalysts is mordenite.

Mordenite is a zeolite of crystalline aluminosilicate material having a silica to alumina ratio ranging from about 9:1 up to greater than 100:1 and containing elliptically shaped pores having minor and major axis of about 5.8 and 7.1 Angstroms, respectively. Decationizing mordenite increases the effective axis of the pores to about 8 Angstroms to 10 Angstroms. The original cations of the small pore zeolites can be replaced by ion exchange by methods well known in the art. Part or all of the original cations can be replaced by metal ions, ammonium ions and hydrogen ions. More preferably, the hydrogen form of mordenite is utilized as the small pore zeolite component of the catalyst of the present invention. Suitable weight ratio of ultrastable Y-type zeolite to small pore zeolite ranges from about 0.5:1 to 10:1.

THE INORGANIC OXIDE GEL MATRIX

Inorganic oxide gels suitable as components of the catalyst of the present invention are amorphous catalytic inorganic oxides such as silica, silica-alumina, silica-zirconia, silica-magnesia, alumina-boria, alumina-titania and the like, and mixtures thereof. Preferably, the inorganic oxide gel is a silica-containing gel, more preferably the inorganic oxide gel is an amorphous silica-alumina component such as a conventional silica-alumina cracking catalyst, several types and compositions of which are commercially available. These materials are generally prepared as a cogel of silica and alumina or as alumina precipitated on a preferred and preaged silica hydrogel. In general, silica is present as the major component in the catalytic solids present in such gel, being present in amounts ranging from about 55 to about 100 weight percent, preferably silica will be present in amounts ranging from about 70 to 90 weight percent. Particularly preferred are two cogels, one comprising about 75 weight percent silica and 25 weight percent alumina and the other comprising from about 87 weight percent silica and 13 weight percent alumina. The inorganic oxide gel component may suitably be present in the catalyst of the present invention in amounts ranging from about 40 to about 90 weight percent, preferably from about 55 to about 75 weight percent, based on the total catalyst.

THE POROUS INERT COMPONENT

Optionally, a porous inert inorganic oxide may be used as component in the catalyst of the present invention.

The porous inert inorganic oxide component of the catalyst of the present invention may be present in the finished catalyst in amounts ranging from about 5 to about 35 weight percent, preferably from about 10 to about 30 weight percent, based on the total catalyst. The inert porous component can be chosen from a wide variety of solid porous catalytically inert materials. The term "catalytically inert" is intended herein to designate that the porous material has substantially no catalytic cracking activity or has less catalytic cracking activity than the inorganic oxide gel component of the catalyst.

Preferably, the inert material will be a bulk material. The term "bulk" with reference to the porous material is intended herein to designate a material which has been preformed and placed in a physical form such that its surface area and pore structure is stabilized so that when it is added to an impure inorganic gel containing considerable amounts of residual soluble salts, the salts will not alter the surface and pore characteristic appreciably, nor will they promote chemical attack on the preformed inert material which could then undergo change. For example, addition of "bulk" alumina will mean a material which has been formed by suitable chemical reaction, the slurry of hydrous alumina aged, filtered, dried, washed free of residual salts and then heated to reduce its volatile content to less than about 15 weight percent. If desired, the washed, aged hydrous alumina filter cake can be reslurried with water and used in making the composite catalyst. The resulting inert material is suitable for use as the porous inert material of the present invention. Suitable materials for use as inert material in the catalyst of the present invention include alumina, titania, zirconia, magnesia and mixtures thereof. Preferably, the porous material is a bulk alumina which may additionally be stabilized with from about 0.5 to about 6 weight percent silica. Alumina stabilized with silica is commercially available. A preferred inert porous material for use as component of the catalyst is one having initially, after heating at 1000° F. in air for six hours, a surface area greater than about 20 square meters per gram (B.E.T. method-Brunauer, Emmett and Teller, see Van Nostrand Chemist's Dictionary 1953 edition), preferably greater than 100 m$^2$/g, more preferably at least 200 m$^2$/g and a pore volume greater than about 0.25 cc/g. Desirably, the inert porous material has at least 0.2 cubic centimeters per gram pore volume in pores having diameters ranging from about 90 to about 200 Angstroms. These stated physical characteristics are those of the porous inert material when taken separately after calcining 6 hours at 1000° F. and prior to being composited with the other components.

Alternatively and optionally, an alumina hydrosol or hydrogel or hydrous alumina slurry may be used, provided that the ultimate porous inert component, when dried and calcined separately has physical characteristics within the above stated ranges.

The catalysts of the present invention may be prepared by any one of several methods. The preferred method of preparing one of the catalysts of the present invention, that is, a catalyst comprising silica-alumina and, as porous inert material, alumina, is to react sodium silicate with a solution of alumina sulfate to form a silica/alumina hydrogel slurry which is then aged to give the desired pore properties, filtered to remove a considerable amount of the extraneous and undesired sodium and sulfate ions and then reslurried in water. Separately, a bulk alumina may be prepared, for example, by reacting solutions of sodium aluminate and aluminum sulfate, under suitable conditions, ageing the slurry to give the desired pore properties to the alumina, filtering, drying, reslurrying in water to remove sodium and sulfate ions and drying to reduce volatile matter content to less than 15 weight percent. The alumina is then slurried in water and blended, in proper amount, with the slurry of impure silica/alumina hydrogel.

The zeolites are added to this blend. A sufficient amount of each component is utilized to give the desired final composition. The resulting mixtures may be filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent.

The catalyst of the present invention is suitable for catalytic cracking. Catalytic cracking with the catalyst of the present invention can be conducted in any of the conventional catalytic cracking manners. Suitable catalytic cracking conditions include a temperature ranging from about 750° to about 1300° F. and at a pressure ranging from about atmospheric to about 100 psig, typically from about atmospheric to about 20 psig. The catalytic cracking process may be carried out as a fixed bed, moving bed, ebullated bed, slurry, transferline (disperse phase) or fluidized bed operation. The catalyst of the present invention is especially suitable for use in a fluidized bed and transferline catalytic cracking process. The catalyst may be regenerated at conditions which include a temperature in the range of about 1100° F. to about 1500° F., preferably from about 1175° F. to about 1350° F.

DESCRIPTION OF THE PREFERRED EMBODIMENTS

The following examples are presented to illustrate the present invention.

EXAMPLE 1

Comparative experiments were made utilizing prior art catalysts, and catalysts of the present invention. A catalyst, herein designated "Catalyst A", is a commercially available catalyst comprising about 16% rare earth exchanged faujasite dispersed in a matrix of silica-alumina gel and kaolin. Final catalyst A comprises about 2.9 weight percent rare earth metal oxides, based on the total catalyst. The catalyst designated "Catalyst B" is not a catalyst of the present invention. Catalyst B was made as follows: A dilute sodium silicate solution was gelled with the measured addition of carbon dioxide under pressure, aged and then mixed with alum solution, the mix being brought to a pH of about 5.5. In a separate vessel, an aqueous slurry of ball milled, oven dried bulk porous alumina was made. The alumina had a surface area (BET) of about 393 m²/g, a total pore volume of 1.35 cc/g and with a pore volume of 1.09 cc/g in pores ranging from about 90 to 200 Angstroms in diameter. Ball milled, calcined hydrogen form of mordenite was added and finally calcined rare earth exchanged Y faujasite (CREY) was added. The CREY contained 17.3 weight percent rare earth metals calculated as sesquioxides. The two slurries were mixed, colloid milled and spray dried. The composite catalyst was washed free of extraneous soluble salts in a conventional manner using ammonium sulfate solution and decationized water. The catalyst was oven dried and calcined at 1000° F. The final "Catalyst A" comprised about 16.5 weight percent hydrogen mordenite; 8.5 weight percent CREY; 20 weight percent bulk porous alumina, and 55% of a silica-alumina gel (75% silica and 25% alumina based on the matrix gel). The final catalyst comprised 1.8 weight percent $RE_2O_3$, that is rare earth metal oxides, based on the total catalyst.

Catalyst C was prepared and evaluated to illustrate more directly the performance of catalyst B with a catalyst of similar composition but which did not comprise a small pore zeolite. Catalyst C was made using the same procedure as catalyst B, that is, portions of the same impure silica/alumina hydrogel, the same bulk porous alumina and rare earth exchanged Y-type faujasites were used, but the mordenite was excluded. Catalyst C comprises about 8.5% calcined rare earth Y faujasite, 29 weight percent bulk porous alumina and 62.5 weight percent silica-alumina gel. Chemical analysis showed catalyst C to contain 1.8 weight percent $RE_2O_3$, 0.16 weight percent $Na_2O$, and 0.60 weight percent $SO_4$. After calcination at 1000° F., catalyst C had a surface area of 353 m²/g and a pore volume of 0.72 cc/g.

Catalysts A, B and C were each steamed 16 hours at 1400° F. and 0 psig and evaluated for activity in a standard microactivity test. The results are summarized in Table I. The steamed catalysts were evaluated for cracking performance in a full cycle cracking operation. The unit was a circulating, fluidized catalytic cracking unit with a regenerator and reactor and stripper vessels. It was operated in a once through fashion, that is, there is no recycle oil mixed with fresh feed. Reactor temperature was 925° F. and regenerator temperature was 1105° F. Feedstock was a 450° to 1100° F. vacuum gas oil. The unit was operated at a constant catalyst to oil ratio of 4. The results are summarized in Table I. In this experiment the catalysts were compared at a constant 70 volume percent conversion (430° F.−).

TABLE I

| Catalyst | C | B | A |
| --- | --- | --- | --- |
| Catalyst Activity (MAT)[1] | 73.9 | 75.0 | 68.0 |
| Yields and Product Qualities at 70% conversion | | | |
| $H_2$ wt. % | 0.053 | 0.031 | 0.027 |
| $C_3^-$ dry gas, wt. % | 5.7 | 5.7 | 6.6 |
| Total $C_4$. vol. % | 14.6 | 15.2 | 15.1 |
| Butylene, vol. % | 7.0 | 8.7 | 5.5 |
| $C_5$/430° F. naphtha, vol. % | 60.4 | 61.5 | 59.0 |
| RONC | 88.9 | 89.0 | 90.3 |
| MONC | 79.4 | 79.0 | 80.1 |
| $\frac{R + M}{2}$ | 84.2 | 84.0 | 85.2 |

[1] Microactivity test. See Oil and Gas Journal, 1966, vol. 64, pages 7, 84, 85 and Nov. 22, 1971, pages 60–68.

The data of Table I show that catalyst B, which comprises mordenite but is not a catalyst of the present invention, was slightly more active than catalyst C, which is a catalyst used for comparison since it has a similar composition except for the omission of mordenite. Catalyst B also produced less hydrogen and coke and produced more butylenes than catalyst C. Although mordenite seems to have contributed to the cracking activity of catalyst B, it did not produce a naphtha of higher octane number than catalyst C, which was the catalyst used for comparison or the reference catalyst A.

EXAMPLE 2

A catalyst of the invention, herein designated "Catalyst D", was made in a manner similar to "Catalyst B" as follows: An aqueous slurry of ball milled, uncalcined porous alumina having surface area and pore properties similar to the alumina used in making catalysts B and C of Example 1, was made and to this slurry was added first a commercially available low soda (0.12% $Na_2O$) ultrastable Y-type faujasite (USY), then the desired amount of calcined, ball milled hydrogen form of mordenite. The mixed slurry was then blended with a slurry of impure silica-alumina hydrogel made as described in Example 1. The bulk alumina added to the slurry was a preformed bulk alumina stabilized with about 2.5 weight percent silica which on calcination at 1000° F. had a surface area (BET) of 523 $m^2/g$, a pore volume of 1.07 cc/g, a pore volume of 0.21 cc/g in pores having diameter in the range of 90 to 200 Angstroms. The catalyst was spray dried to produce microspheres, washed free of extraneous soluble salts, dried and calcined at 1000° F. The catalyst, designated "Catalyst D", which is a catalyst in accordance with the present invention, had a composition of about 10 weight percent ultrastable Y zeolite; 10 weight percent hydrogen mordenite; 20 weight percent bulk porous silica stabilized alumina and 60 weight percent silica-alumina gel (said gel having a composition of 75 weight percent silica and 25 weight percent alumina). The weights of the individual components are based on the total catalyst. Chemical analysis showed $Na_2O$ content of 0.04% and a $SO_4$ content of 0.57%.

EXAMPLE 3

Catalyst E is also a catalyst of reference. It was made by making a mixed aqueous slurry of commercially available low soda (0.12 weight percent $Na_2O$) ultrastable Y faujasite and ball milled uncalcined bulk porous silica stabilized alumina (same alumina as the one used in making catalyst D) blending the slurry with a slurry of impure silica-alumina hydrogel (made as described in Example 1), spray drying the composite to form microspheres, washing the material to remove extraneous soluble salts, drying and calcining at 1000° F. Catalyst E comprised 20 weight percent ultrastable Y-type faujasite, 20 weight percent bulk porous alumina, 60 weight percent silica-alumina gel. Chemical analysis showed an $Na_2O$ content of 0.08 weight percent and a sulfate content of 0.11 weight percent.

Catalysts D and E were each steamed 16 hours at 1400° F. and 0 psig and evaluated for activity in a standard microactivity test. The results are summarized in Table II. The steamed catalysts were also evaluated for cracking performance in a catalytic cracking unit previously described in Example 1, and at the same conditions as given in Example 1. In this set of tests, the feed used was a 560/1050° F. vacuum gas oil. Results of the experiments with Catalyst D are compared with the reference catalysts, that is, catalysts "A" and "E" in the same cracking unit at a constant 70 volume percent 430° F.⁻ conversion. The results are summarized in Table II.

TABLE II

| Catalyst | A | D | E |
|---|---|---|---|
| Catalyst Activity (MAT) | 69. | 71.6 | 73.5 |
| Product Yields and Qualities | | | |

TABLE II-continued

| Catalyst | A | D | E |
|---|---|---|---|
| Coke, wt. % | 3.5 | 2.5 | 2.7 |
| $H_2$, wt. % | 0.06 | 0.10 | 0.06 |
| $C_3^-$ dry gas, wt. % | 5.6 | 7.2 | 6.4 |
| $C_3H_6$, wt. % | 3.7 | 4.7 | 4.4 |
| Total $C_4$, vol. % | 13.1 | 13.3 | 11.8 |
| $C_4H_8$ (tot.), vol. % | 6.8 | 8.0 | 7.6 |
| $C_5/430°$ F., vol. % | 60.7 | 60.5 | 62.0 |
| RON Clear | 90.8 | 93.9 | 93.8 |
| MON Clear | 79.8 | 81.5 | 80.5 |
| $\frac{R + M}{2}$ | 85.3 | 87.7 | 87.2 |
| $C_5/430°$ F., incl. alkylate, vol % | 82.0 | 87.0 | 87.0 |

Catalyst D, which is a catalyst in accordance with the present invention, produced less coke, more light olefins, and higher naphtha octanes than either reference catalyst A, which contained rare earth faujasite, or reference catalyst E, which had a higher ultrastable Y zeolite content than catalyst D but no small pore zeolite (i.e. mordenite). If the increased $C_3$ and $C_4$ olefin yields are considered as potential alkylate, the combined $C_5/430°$ F. cracked naphtha and alkylate naphtha yield for catalyst D is the same as for reference catalyst E and significantly higher than for reference catalyst A. It is surprising that mordenite, when present with ultrastable Y-type zeolite in catalyst D, gave a substantially higher octane number increase than that obtained when combined with rare earth Y faujasite (CREY) in catalyst B (see Table I) which produced no apparent octane improvement relative to reference catalyst C or relative to a conventional prior art commercial catalyst A.

What is claimed is:
1. A catalyst comprising:
   (a) an ultrastable Y-type crystalline aluminosilicate zeolite having less than about 1 weight percent rare earth metals, calculated as the elemental metal, based on the zeolite;
   (b) a small pore crystalline aluminosilicate zeolite selected from the group consisting of erionite, mordenite, zeolite A, chabazite and offretite; and
   (c) a catalytic inorganic oxide matrix.
2. The catalyst of claim 1 wherein said catalyst additionally comprises a porous inorganic oxide having initially a surface area greater than about 20 square meters per gram and a pore volume greater than about 0.25 cubic centimeters per gram.
3. The catalyst of claim 2 wherein said porous inorganic oxide has initially a surface area greater than about 100 square meters per gram and at least 0.2 cubic centimeter per gram of its pore volume in pores having diameters ranging from 90 to 200 Angstroms.
4. The catalyst of claim 1 wherein the weight ratio of said ultrastable Y-type zeolite to said small pore zeolite ranges from about 0.5:1 to about 10:1.
5. The catalyst of claim 1 wherein said small pore crystalline zeolite is mordenite.
6. The catalyst of claim 5 wherein said mordenite is the hydrogen form of mordenite.
7. The catalyst of claim 2 wherein said porous inorganic oxide is selected from the group consisting of alumina, titania, zirconia, magnesia and mixtures thereof.
8. The catalyst of claim 2 wherein said porous inorganic oxide comprises porous alumina.
9. The catalyst of claim 2 wherein said porous inorganic oxide comprises alumina stabilized with from about 0.5 to about 6 weight percent silica.
10. The catalyst of claim 1 wherein said matrix comprises silica-alumina.
11. The catalyst of claim 1 wherein said catalyst comprises from about 5 to about 40 weight percent of said ultrastable Y-type zeolite.

* * * * *